US011736033B2

(12) United States Patent
Wang et al.

(10) Patent No.: US 11,736,033 B2
(45) Date of Patent: Aug. 22, 2023

(54) CURRENT FED HIGH-FREQUENCY ISOLATED MATRIX CONVERTER WITH THE CORRESPONDING MODULATION AND CONTROL SCHEMES

(71) Applicant: SOUTHEAST UNIVERSITY, Nanjing (CN)

(72) Inventors: Zheng Wang, Nanjing (CN); Yang Xu, Nanjing (CN); Pengcheng Liu, Nanjing (CN); Zhixiang Zou, Nanjing (CN); Ming Cheng, Nanjing (CN)

(73) Assignee: SOUTHEAST UNIVERSITY, Nanjing (CN)

( * ) Notice: Subject to any disclaimer, the term of this patent is extended or adjusted under 35 U.S.C. 154(b) by 110 days.

(21) Appl. No.: 17/622,234

(22) PCT Filed: Feb. 4, 2021

(86) PCT No.: PCT/CN2021/075304
§ 371 (c)(1),
(2) Date: Dec. 23, 2021

(87) PCT Pub. No.: WO2022/134278
PCT Pub. Date: Jun. 30, 2022

(65) Prior Publication Data
US 2022/0416679 A1 Dec. 29, 2022

(30) Foreign Application Priority Data
Dec. 21, 2020 (CN) .......................... 202011517323.X

(51) Int. Cl.
*H02M 7/48* (2007.01)
*H02M 1/00* (2006.01)
*H02M 7/5387* (2007.01)

(52) U.S. Cl.
CPC ....... *H02M 7/4807* (2013.01); *H02M 1/0058* (2021.05); *H02M 7/53876* (2021.05)

(58) Field of Classification Search
CPC .. H02M 7/48; H02M 7/4807; H02M 7/53876; H02M 1/0058
See application file for complete search history.

(56) References Cited

U.S. PATENT DOCUMENTS 5,491,624 A * 2/1996 Levran .................. H02M 7/219
363/44
9,973,107 B2 * 5/2018 Cerqueira Pinto Bezerra
Varajão ................. H02M 5/297
(Continued)

FOREIGN PATENT DOCUMENTS

CN 106787914 A 5/2017
CN 111884532 A * 11/2020 .............. H02M 1/08
WO 2019036201 A1 2/2019

OTHER PUBLICATIONS

Translation: CN111884532A Wang et al. disclose a Narrow-pulse-free modulation method suitable for three-phase high-frequency link matrix converter (Year: 2020).*
(Continued)

*Primary Examiner* — Gary L Laxton
(74) *Attorney, Agent, or Firm* — Gokalp Bayramoglu

(57) ABSTRACT

A current fed high-frequency isolated matrix converter and the corresponding modulation and control schemes are provided. The converter includes a current source full-bridge converter, a high-frequency transformer, a matrix converter, and a three-phase filter. An optimized space vector modulation solution is used for controlling the converter, and by comparing magnitudes of three-phase filter capacitor voltages to determine an action sequence of space vectors, switch tubes are turned on at zero voltage. A current source full-bridge circuit adopts a commutation strategy of a sec-
(Continued)

ondary clamping, and by calculating a leakage inductive current commutation time, full-bridge switch tubes are turned off at zero current to achieve safe and reliable commutation, and having advantages of a low system loss, a high efficiency, and a high power density.

10 Claims, 11 Drawing Sheets

(56) References Cited

U.S. PATENT DOCUMENTS

2021/0013811 A1* 1/2021 Kudoh ................ H02M 7/4807
2021/0126550 A1* 4/2021 Yenduri ................ H02M 7/217

OTHER PUBLICATIONS

Yang Xu, et al., Zero-Voltage-Switching Current-Source-Inverter Motor Drives Based on Silicon Carbide Devices, 2019 22nd International Conference on Electrical Machines and Systems (ICEMS), 2019.

* cited by examiner

CURRENT FED HIGH-FREQUENCY ISOLATED MATRIX CONVERTER WITH THE CORRESPONDING MODULATION AND CONTROL SCHEMES

CROSS REFERENCE TO THE RELATED APPLICATIONS

This application is the national stage entry of International Application No. PCT/CN2021/075304, filed on Feb. 4, 2021, which is based upon and claims priority to Chinese Patent Application No. 202011517323.X filed on Dec. 21, 2020, the entire contents of which are incorporated herein by reference.

TECHNICAL FIELD

The present invention belongs to renewable energy power generation technologies, especially a grid-connected converter, and in particular, relates to a current source input high-frequency isolated matrix converter and the corresponding modulation and control schemes, which belongs to the field of power generation, transformation, or power distribution technologies.

BACKGROUND

The development of new energy technologies has an increasing demand for high-efficiency and high-reliability converters. Non-isolated grid-connected converters have relatively large ground leakage currents and safety issues, which limit their further application in the field of distributed power generation. Isolated grid-connected converters are classified into low-frequency isolation and high-frequency isolation. The low-frequency isolation converter achieves isolation by using a line-frequency transformer. The line-frequency transformer is large in size and weight, and the power density of a power converter is relatively low. The high-frequency isolation converter achieves isolation by using a high-frequency transformer, and has advantages of high efficiency, high power density, and easy voltage matching.

High-frequency isolation converters are classified into two categories, one is a two-stage isolation converter, and the other is a single-stage matrix converter. A forward stage of the two-stage isolation converter is an isolation DC converter such as a resonant converter and a full-bridge converter, and a backward stage is an inverter. Between the two stages, an intermediate DC energy storage link, that is, a large aluminum electrolytic capacitor, needs to be added to maintain the stability of a bus voltage. However, the electrolytic capacitor has a short life and a high failure rate, and can only operate at 105°, which is not conducive to the reliability of the system and limits the application of the two-stage isolation converter under extreme conditions of the system. In addition, the two-stage isolation converter has two-stage conversion, and the system loss is relatively high. The conventional single-stage matrix converter is of a voltage input type. A current flowing through a transformer is polygonal due to the presence of a leakage inductive current. Under the same current effective value, the polygonal current has a higher amplitude and higher loss, and the efficiency is relatively low. The voltage fed matrix converter has two states: current continuous and current discontinuous, the calculation of a duty cycle is complicated, and the processor has a heavy calculation burden. The range of soft switching of the voltage fed matrix converter is limited, and there is a large conduction loss when input and output voltages do not match. Therefore, it is difficult for the voltage fed matrix converter to achieve effective conversion of a wide range of input voltage.

The current fed matrix converter has advantages of direct current control, limited short-circuit current, low input current ripple, and boosted input voltage. However, there is a high voltage spike due to a difference between an inputted inductive current and a converter leakage current. Usually, a clamping circuit is added in an H-bridge of the converter to suppress the spike voltage. The introduction of the clamping circuit reduces the efficiency and power density of the converter. An improved active clamping circuit for a fuel cell push-pull converter can improve the efficiency and power density of the converter, but the push-pull converter using the improved active clamping circuit cannot achieve bidirectional energy flow. A soft-switching technology realized by resonance of a leakage inductor and a secondary parallel capacitor of a current input matrix converter can realize commutation of a leakage inductive current without a clamping circuit, but a soft-switching range is limited and bidirectional energy flow cannot be realized.

A method of sorting input vectors of a converter can realize ZVS of a matrix converter, but the modulation method is less robust, and a sampling error of an effective phase angle or a sampling error of a grid voltage will cause a serious short-circuit problem. Using a discontinuous leakage inductive current to realize the soft switching modulation method of switches in a high-frequency matrix converter has defects of a large leakage inductive current and large loss. The modulation method of sorting a conduction sequence of bidirectional switches in the matrix converter according to a grid phase voltage and a high-frequency transformer current can realize ZCS of all switches in an H-bridge and ZVS of all switch tubes in the matrix converter, but a current flowing through a body diode of a MOS tube and a current flowing through a synchronous rectifier tube are not effectively used. The MOS tube can reduce the loss in the synchronous rectification mode, especially the synchronous rectification mode of the matrix converter under light load conditions.

The purpose of this application is to propose a current fed input high-frequency matrix converter, and achieve ZVS of all switches of the converter in a discontinuous mode by sorting current vectors according to an output voltage of the matrix converter.

SUMMARY

The purpose of the present invention is to provide a current fed high-frequency isolation matrix converter and a method for controlling the same in view of the deficiencies of the above background, abandon the solution of introducing a clamping circuit to improve the efficiency and power density. For a single-stage topology formed by a current source full-bridge inverter, a high-frequency transformer, and a matrix converter, the sequence of current vectors is adjusted according to output capacitor voltages of the matrix converter, thus realizing ZVS of all switches of the current source input matrix converter, reducing the leakage current of the grid-connected converter, improving the efficiency and power density, and solving the technical problems of low efficiency and limited soft switching range of the voltage fed input matrix converter.

In order to achieve the objective of the present invention, the following technical solution is adopted in the present invention.

A current source input high-frequency isolation matrix converter comprises: a current source full-bridge converter, a high-frequency transformer, a matrix converter, and a three-phase filter circuit. The current source full-bridge converter comprises: a bridge arm formed by a first switch tube and a second switch tube connected in series, and another bridge arm formed by a third switch tube and a fourth switch tube connected in series, wherein the two bridge arms are connected to a DC bus, a bus inductor is connected in series to the DC bus, and the DC bus is connected to a current source on a DC side. A primary coil of the high-frequency transformer is connected to an output end formed by a midpoint of the two bridge arms of the current source full-bridge converter. The matrix converter comprises: an a-phase bridge arm formed by a first bidirectional switch tube and a fourth bidirectional switch tube connected in series, a b-phase bridge arm formed by a third bidirectional switch tube and a sixth bidirectional switch tube connected in series, and a c-phase bridge arm formed by a fifth bidirectional switch tube and a second bidirectional switch tube connected in series; a three-phase bridge arm is connected to the DC bus, the DC bus is connected to a secondary coil of the high-frequency transformer, and the three-phase filter circuit is connected between a midpoint of the three-phase bridge arm of the matrix converter and a load.

An action sequence of current vectors of the matrix converter is determined according to a line voltage loaded on a filter capacitor, and the current source input high-frequency isolation matrix converter is subjected to a positive half-cycle zero vector action stage, a first active vector action stage, a second active vector action stage, a current source full-bridge converter commutation stage, a current source full-bridge converter freewheeling stage, and a negative half-cycle zero vector action stage in turn under the action of the current vector.

Three current vectors acting on the matrix converter in a positive half cycle of a switch are a zero vector $I_7$, a first active vector $I_{1+}$, and a second active vector $I_{2+}$, corresponding input voltages of the matrix converter are $U_0$, $U_1$, and $U_2$, after line voltages on adjacent two-phase capacitors are compared, and when it is determined that an action sequence of the three current vectors is $I_7 > I_{1+} > I_{2+}$, $U_2 > U_1 > U_0$, and a control process of the current source input high-frequency isolation matrix converter in a positive half cycle of a switch is as follows a. State 1: Positive Half-Cycle Zero Vector Action Stage at the beginning of a switch cycle, the zero vector $I_7$ acts on the matrix converter, the first bidirectional switch and the fourth bidirectional switch in the matrix converter are turned on, and the first switch tube and the fourth switch in the current source full-bridge converter are turned on;

b. State 2: First Active Vector Action Stage after a zero vector action time has expired, the first active vector $I_{1+}$ acts on the matrix converter, the first switch tube and the fourth switch tube in the current source full-bridge converter maintain an ON state, a phase voltage on an ab-phase capacitor is greater than 0, a secondary current of the high-frequency transformer charges an output capacitor of the sixth bidirectional switch tube, the sixth bidirectional switch tube is turned on at zero voltage, the fourth bidirectional switch tube is turned off, a secondary voltage of the high-frequency transformer is equal to a line voltage on the ab-phase capacitor, and energy is fed from a DC side to an AC side;

c. State 3: Second Active Vector Action Stage after an action time of the first active vector $I_{1+}$ has expired, the second active vector $I_{2+}$ acts on the matrix converter, the first switch tube and the fourth switch tube in the current source full-bridge converter maintain an ON state, a line voltage on an ac-phase capacitor is greater than the line voltage on the ab-phase capacitor, the secondary current of the high-frequency transformer charges an output capacitor of the second bidirectional switch, the second bidirectional switch is turned on at zero voltage, the sixth bidirectional switch is turned off, the secondary voltage of the high-frequency transformer is equal to the line voltage on the ac-phase capacitor, and energy is fed from the DC side to the AC side;

d. State 4: Current Source Full-Bridge Converter Commutation Stage in the matrix converter, the first bidirectional switch tube and the second bidirectional switch tube maintain the ON state, all the switches of the current source full-bridge converter are overlapped and turned on, and the second switch tube and the third switch tube are turned on at zero current;

e. State 5: Current Source Full-Bridge Converter Freewheeling Stage after an overlapped ON time of all the switches of the current source full-bridge converter has expired, the second bidirectional switch tube in the matrix converter is turned off, the fourth bidirectional switch tube is turned on at zero voltage, a secondary voltage of the converter is zero, anti-parallel diodes of the first switch tube and the fourth switch tube are freewheeling, and the first switch tube and the fourth switch tube are turned off at zero current; and f. State 6: Negative Half-Cycle Zero Vector Action Stage after the first switch tube and the fourth switch tube are turned off at zero current, the zero vector $I_7$ acts on the matrix converter, the first bidirectional switch and the fourth bidirectional switch tube in the matrix converter maintain the ON state, and the second switch tube and the third switch tube in the current source full-bridge converter maintain the ON state.

Further, in a method for controlling a current source input high-frequency isolation matrix converter, the action times of the three current vectors of the matrix converter are corrected according to the overlapped ON time of all the switches of the current source full-bridge converter.

Further, in the control method for a current source input high-frequency isolation matrix converter, the corrected action times of the three current vectors of the matrix converter are:

$$\begin{cases} T_1 = T_s m_a \sin\left(\dfrac{\pi}{6} - \theta_i\right) \\ T_2 = T_s m_a \sin\left(\dfrac{\pi}{6} + \theta_i\right) + 2T_d, \\ T_0 = T_s - T_1 - T_2 \end{cases}$$

wherein $T_1$, $T_2$, and $T_0$ are the action times of the first active vector $I_{1+}$, the second active vector $I_{2+}$, and the zero vector $I_7$, respectively, $m_a$ and $\theta_i$ are a modulation ratio and an angle of space vector modulation, $T_s$ is a switch cycle, and $T_d$ is the overlapped ON time of all the switches of the current source full-bridge converter.

Further, in the method for controlling the current source input high-frequency isolation matrix converter, the overlapped ON time of all the switches of the current source full-bridge converter is $T_d=2i_{Lm}L_1n_s/u_{ac}n_p$, wherein $T_d$ is the overlapped ON time of all the switches of the current source full-bridge converter, $i_{Lm}$ is a DC bus current of the current source full-bridge converter, $L_1$ is a leakage inductance of the high-frequency transformer, $n_p/n_s$ is a turn ratio of the high-frequency transformer, and $u_{ac}$ is the line voltage on the ac-phase capacitor.

A control system of the current source input high-frequency isolation matrix converter comprises:

a PLL having an input end connected to line voltages on adjacent two-phase capacitors, and outputting a grid frequency $\omega_g$, a grid phase $\theta_g$, and a dq-axis component of a voltage of a filter capacitor;

a low-pass filter having an input end connected to the dq-axis component of the voltage of the filter capacitor and the grid frequency, and outputting a steady-state current of the filter capacitor;

a current given-value correction module having an input end connected to a given current value and an actual current value of an input DC bus of a current source full-bridge converter and a d-axis component of the steady-state current of the filter capacitor, wherein an error between the given current value and the actual current value of the input DC bus of the current source full-bridge converter is processed by a PI and then accumulates the d-axis component of the steady-state current of the filter capacitor, and a final current given-value is outputted;

a coordinate transformation module configured to perform coordinate transformation on the final current given-value, and output a given-value of a DC current and a trigger delay angle; and a space vector modulation module having an input end connected to the given-value of the DC current and the trigger delay angle, and configured to calculate a modulation ratio and a modulation angle, and then output a switching pulse of the matrix converter.

Further, the control system of the current source input high-frequency isolation matrix converter further comprises a selector and an overlapped ON time calculation module, the selector is configured to select a maximum value from the line voltages on the adjacent two-phase capacitors and output the maximum value, and the overlapped ON time calculation module is configured to calculate an overlapped ON time of all switches of the current source full-bridge converter according to the maximum value outputted by the selector, a current of the input DC bus of the current source full-bridge converter, and a leakage inductance of a high-frequency transformer, and the space vector modulation module is configured to correct action times of three current vectors of the matrix converter according to a calculation result outputted by the overlapped ON time calculation module.

The above current source input high-frequency isolation matrix converter is suitable for application scenarios of sine wave power supply. When the converter is used in a driving system of a fuel cell hybrid motor, a DC converter is connected between the current source and the input DC bus of a current source full-bridge converter, and an output end of the three-phase filter circuit is connected to a three-phase motor. A modulation ratio is set to a fixed value, a phase of a voltage of a three-phase filter capacitor is detected by using an encoder, and a current inputted to the DC bus of the full-bridge converter is adjusted by controlling the DC converter.

The present invention has the following beneficial effects by adopting the above technical solution.

(1) The current source input high-frequency isolation matrix converter disclosed in this application adopts a single-stage topology formed by a current source full-bridge converter, a high-frequency transformer, a matrix converter, and a three-phase filter. A space vector modulation strategy in which line voltages of filter capacitors determine an action sequence of vectors realizes turn-on of all switches of the matrix converter at zero voltage, and safe and reliable commutation of the full-bridge switch is realized through a commutation strategy of secondary clamping. There is no need to add a clamping circuit to suppress a voltage spike, thus realizing the soft switching of all switch tubes in the full load range, which is beneficial to reducing system losses, improving efficiency and power density, and overcoming the defect of the limited soft switching range of the existing voltage input matrix converters.

(2) The current source input high-frequency isolation matrix converter disclosed in this application does not require electrolytic capacitors to connect the current source full-bridge converter and the matrix converter, which overcomes the defects of poor reliability and short service life of the two-stage converter due to the need for electrolytic capacitors for connecting the forward and backward stages.

(3) The current source input high-frequency isolation matrix converter disclosed in this application has the advantage of a constant input current, so that the current of the high-frequency transformer is in the form of a square wave. Compared with a voltage source matrix converter, a current peak value is reduced, and the system loss is reduced.

(4) The input current of the current source input high-frequency isolation matrix converter disclosed in this application is continuous, a leakage inductive current is continuous without discontinuity, the duty cycle calculation is simpler, and the calculation burden of a controller is reduced.

Figure 1:
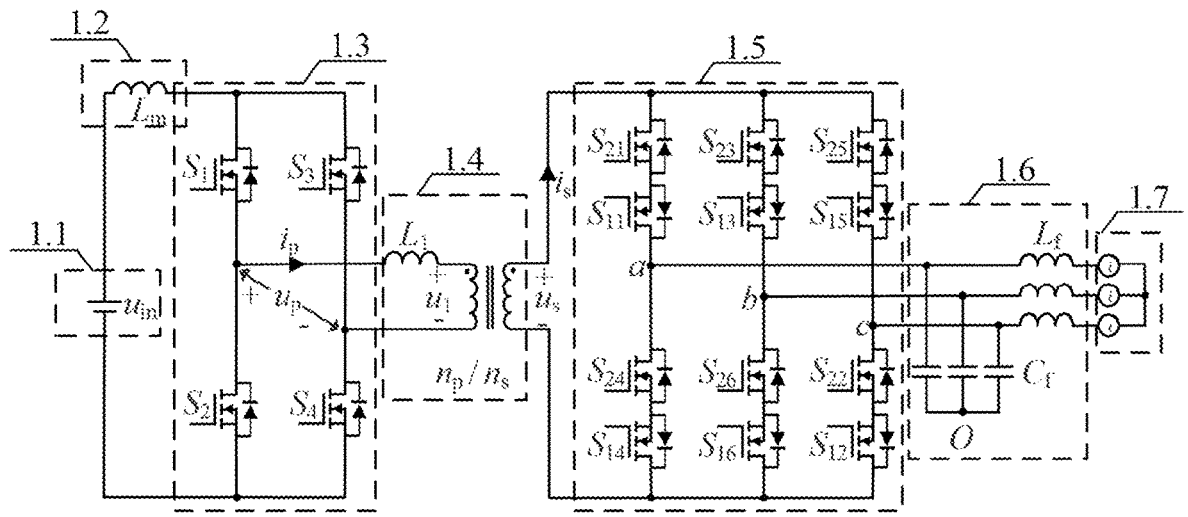
FIG. 1 is a topological diagram of a main circuit of a current source input high-frequency matrix converter disclosed in this application.

Illustration of reference numerals: 1.1, storage battery, 1.2, bus inductor, 1.3, current source full-bridge converter, 1.4, high-frequency transformer, 1.5, matrix converter, 1.6, three-phase filter circuit, and 1.7, three-phase load.

DETAILED DESCRIPTION OF THE EMBODIMENTS

The technical solution of the present invention will be described in detail with reference to the accompanying drawings.

The current source input high-frequency isolation matrix converter disclosed in this application is shown in FIG. 1. A DC side adopts a current source input converter, and a grid side adopts a direct matrix converter. The current source input converter transmits energy to a single-stage matrix converter through a high-frequency transformer. The current source full-bridge converter 1.3 is a full-bridge converter formed by a first switch tube $S_1$, a second switch tube $S_2$, a third switch tube $S_3$, and a fourth switch tube $S_4$. The matrix converter 1.5 includes: a first bidirectional switch tube in which a switch tube $S_{21}$ and a switch tube $S_{11}$ are connected to a common source, a second bidirectional switch tube in which a switch tube $S_{22}$ and a switch tube $S_{12}$ are connected to a common source, a third bidirectional switch tube in which a switch tube $S_{23}$ and a switch tube $S_{13}$ are connected to a common source, a fourth bidirectional switch tube in which a switch tube $S_{24}$ and a switch tube $S_{14}$ are connected to a common source, a fifth bidirectional switch tube in which a switch tube $S_{25}$ and a switch tube $S_{15}$ are connected to a common source, a sixth bidirectional switch tube in which a switch tube $S_{26}$ and a switch tube $S_{16}$ are connected to a common source, a midpoint of a bridge arm formed by the first bidirectional switch tube and the fourth bidirectional switch tube connected in series is denoted as a, a midpoint of a bridge arm formed by the third bidirectional switch tube and the sixth bidirectional switch tube connected in series is denoted as b, and a midpoint of a bridge arm formed by the fifth bidirectional switch tube and the second bidirectional switch tube connected in series is denoted as c. A three-phase filter circuit 1.6 includes three single-phase filter circuits, each single-phase filter circuit is an LC series circuit, capacitors of the three single-phase filter circuits are connected in parallel to a point O, and inductors of the three single-phase filter circuits are connected to a three-phase load 1.7. A bus inductor 1.2 is connected in series to an input DC bus of the current source full-bridge converter 1.3, a storage battery 1.1 is connected in series to the bus inductor 1.2, and the bus inductor 1.2 provides a stable DC bus current for the full-bridge converter. A primary coil of a high-frequency transformer 1.4 is connected to an output side formed by the midpoint of the two bridge arms of the current source full-bridge converter 1.3, and a DC bus of the matrix converter 1.5 is connected to a secondary coil of the high-frequency transformer 1.4. The midpoints of the three bridge arms of the matrix converter 1.5 are respectively connected to connection points of a capacitor and an inductor in each phase filter circuit.

The current source input matrix converter shown in 1 may be equivalently decoupled as two three-phase current source converters connected in parallel as shown in 8; therefore, a current space vector modulation method can be applied to the current source input matrix converter, and changing an action sequence of current vectors can cause input voltages of the converter to be ascending, thereby realizing the soft switching of all switch tubes, further reducing the loss of the converter, reducing the mass and volume of an EMI filter, and increasing the power density of the system. The commutation of the primary current source full-bridge converter takes up part of action time of the active vector of the matrix converter, which leads to an increase in the system output current harmonics. Therefore, it is necessary to compensate the vector action time to reduce the output current harmonics of the converter and reduce the harmonic losses.

Figure 2A:
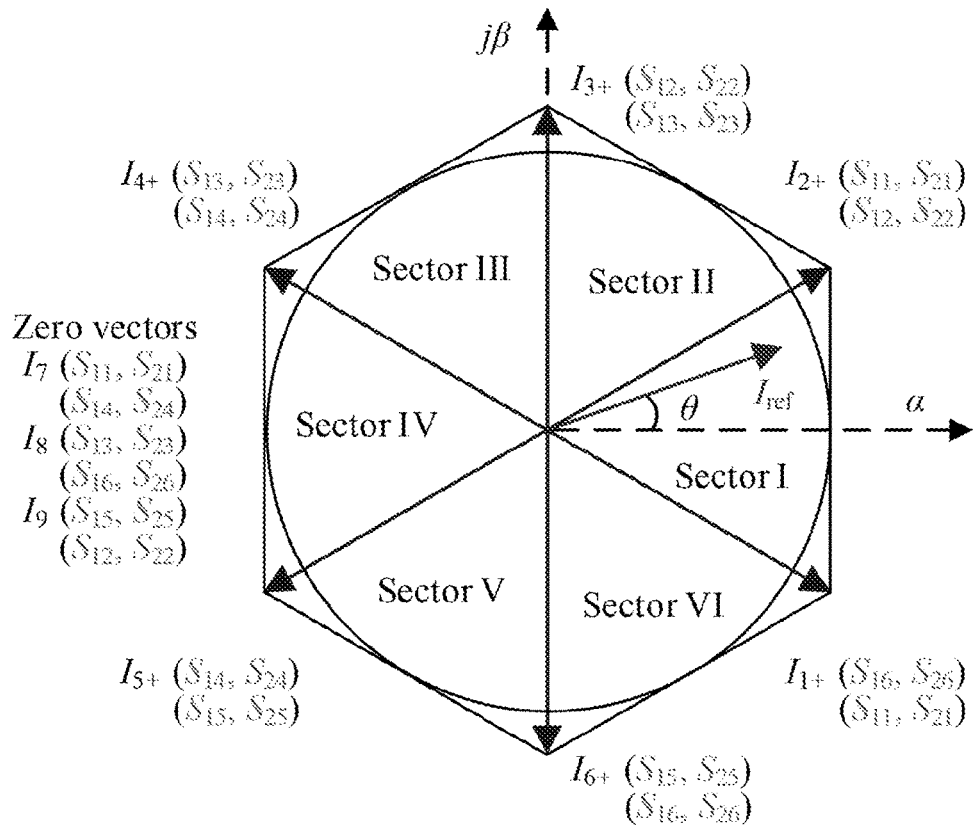
FIG. 2A and FIG. 2B are current space vector diagrams of a positive half cycle and a negative half cycle of a matrix converter.
Figure 2B:
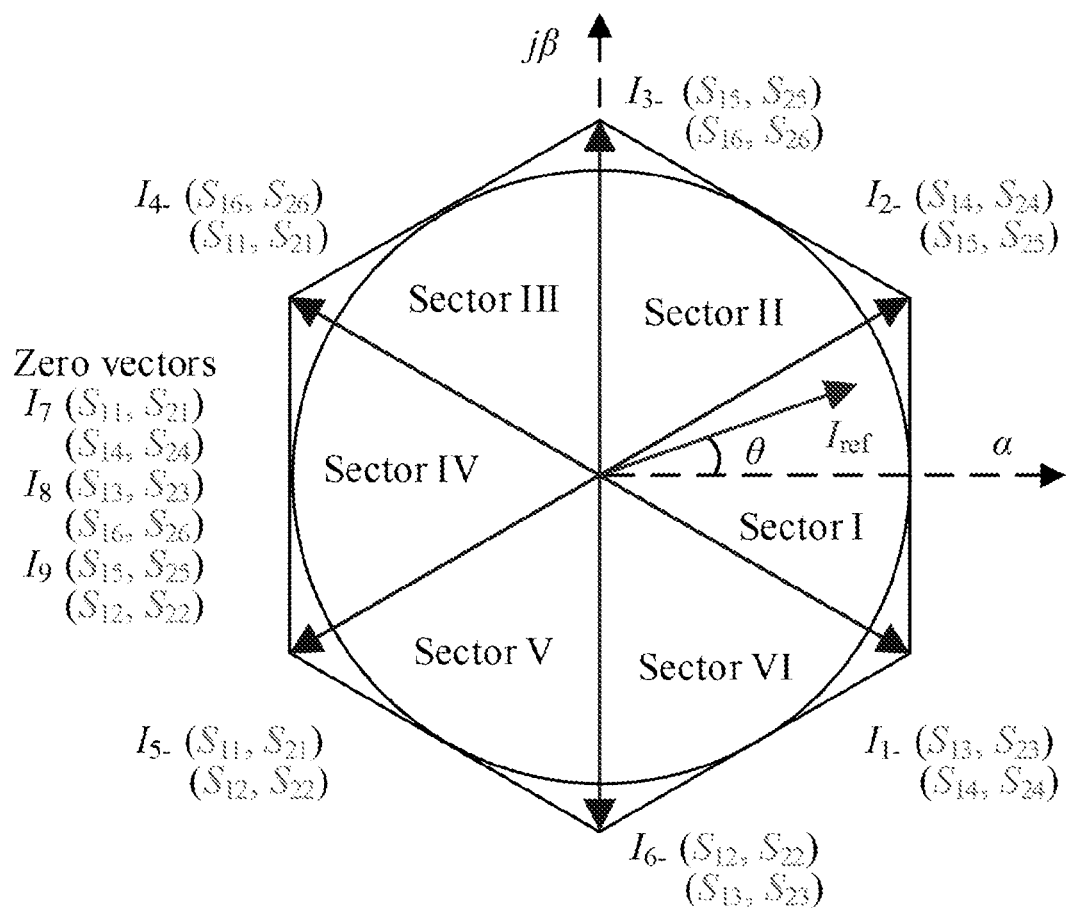
Figure 3:
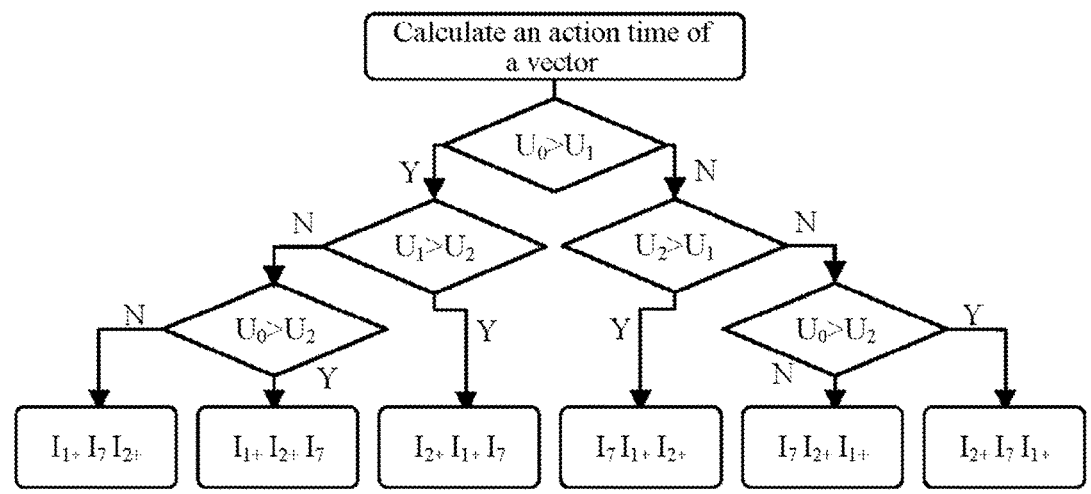
FIG. 3 is a flowchart of sorting current vectors in a positive half cycle of a first sector.
Figure 6:
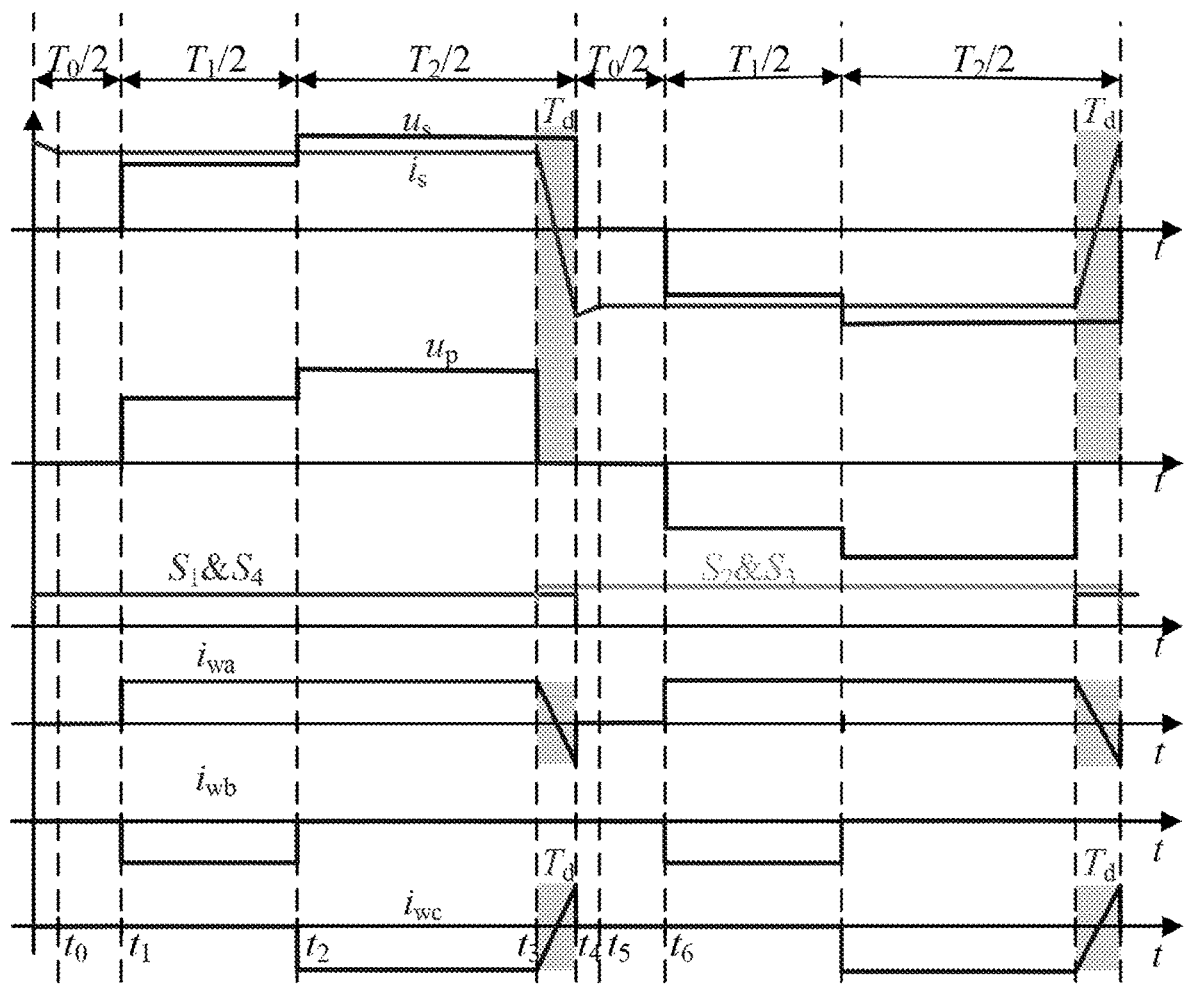
FIG. 6 is a key oscillogram in a switch cycle.

As shown in FIG. 2A and FIG. 2B, one switch cycle of the matrix converter is divided into positive and negative half cycles with switching states differing by 180°. In order to simplify the analysis, only a mode of the first half cycle is analyzed. Taking a sector I as an example, three current vectors acting on the matrix converter 1.5 in the half switch cycle are $I_7$, $I_{1+}$, and $I_{2+}$, corresponding input voltages of the current source full-bridge converter are 0, $U_1$, and $U_2$, and input voltages of converter are caused to be ascending by changing the action sequence of current vectors. The vector sorting method is shown in FIG. 3. It is assumed here that $0<U_1<U_2$, and according to FIG. 3, the action sequence of the current vectors in the half cycle is $I_7$, $I_{1+}$, and $I_{2+}$. A modulation process of the matrix converter in the half switch cycle is subjected to 6 states, where current circulation paths in 6 states are shown in FIGS. 4A-4F, and a key oscillogram in a switch cycle is shown in FIG. 6.

1) State 1: Matrix Converter Zero Vector Function

Figure 4A:
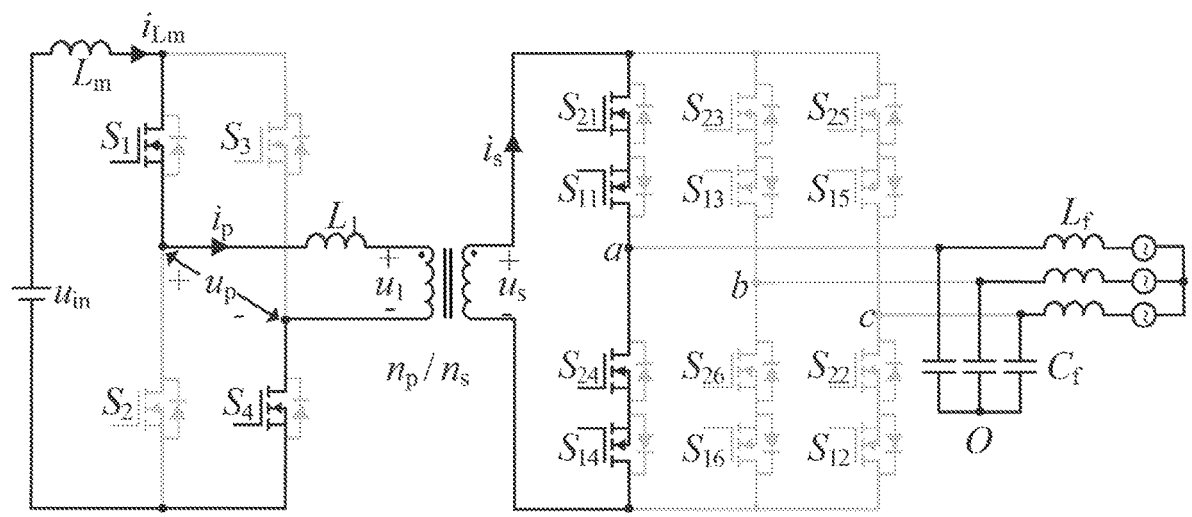
FIG. 4A to FIG. 4F are current flow path diagrams when a converter is in State 1, State 2, State 3, State 4, State 5, and State 6 during the first half of a switch cycle.

At the beginning of the switch cycle, a current vector corresponding to the matrix converter 1.5 is the zero vector $I_7$. At this time, the matrix converter switch tubes $S_{21}$, $S_{11}$, $S_{24}$, and $S_{14}$ are turned on, and the current source full-bridge converter switch tubes $S_1$ and $S_4$ are turned on. At this time, it is in an inductive energy storage stage, and there is no energy flow between the storage battery and the grid. An equivalent circuit is shown in FIG. 4A. Waveforms of three-phase capacitor currents $i_{wa}$, $i_{wb}$, and $i_{wc}$, a bus current $i_s$ and a switch tube control signal of the current source full-bridge converter, and primary and secondary voltages $u_p$ and $u_s$ of the high-frequency transformer may be obtained with reference to the oscillogram during the time period [$t_0$, $t_1$] as shown in FIG. 6.

2) State 2: Matrix Converter Active Vector Function

Figure 4B:
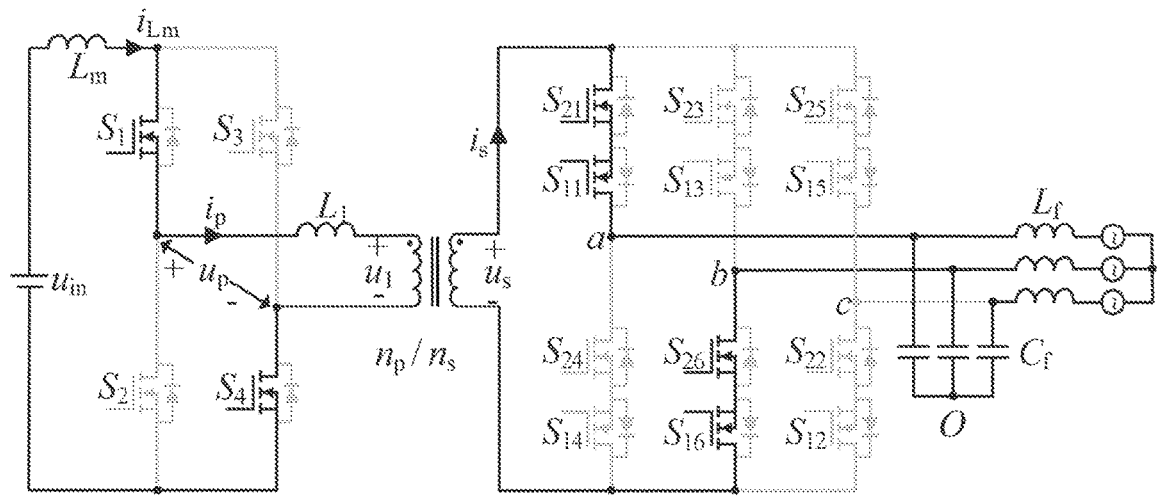

After the zero vector action time has expired, the first active vector $I_{1+}$ of the matrix converter starts to work. The primary bus current of the transformer flows through the switch tubes $S_1$ and $S_4$, and the secondary current of the transformer flows through the switch tubes $S_{21}$, $S_{11}$, $S_{26}$, and $S_{16}$. Since the capacitor voltage $u_{ab}$ is greater than zero, the transformer current charges output capacitors of $S_{16}$ and $S_{26}$, $S_{16}$ and $S_{26}$ are turned on at zero voltage, the secondary voltage of the transformer is equal to $u_{ab}$, and the power is fed from the storage battery to the grid. An equivalent circuit is shown in FIG. 4B. Waveforms of three-phase capacitor currents $i_{wa}$, $i_{wb}$, and $i_{wc}$, a bus current $i_s$ and a switch tube control signal of the current source full-bridge converter, and primary and secondary voltages $u_p$ and $u_s$ of the high-frequency transformer may be obtained with reference to the oscillogram during the time period [t$_1$, t$_2$] as shown in FIG. 6.

3) State 3: Matrix Converter Active Vector Function

Figure 4C:
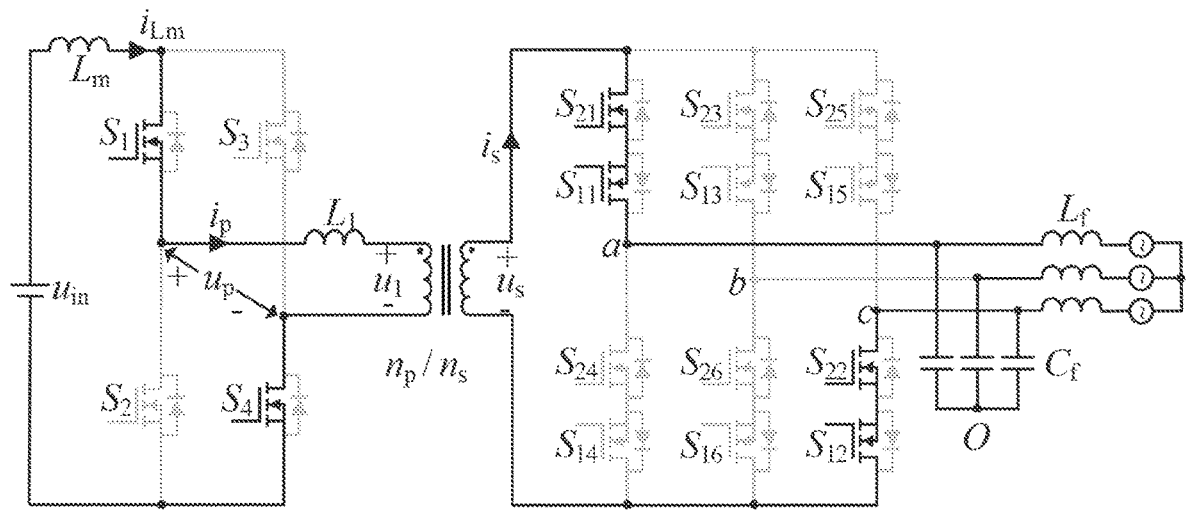

After an action time of the active vector I$_{1+}$ of the matrix converter has expired, the second active vector I$_{2+}$ of the matrix converter starts to work. The primary bus current of the transformer flows through the switch tubes S$_1$ and S$_4$, and the secondary current of the transformer flows through the switch tubes S$_{21}$, S$_{11}$, S$_{22}$, and S$_{12}$. Since the capacitor voltage u$_{ac}$ is greater than u$_{ab}$, the transformer current charges output capacitors of S$_{12}$ and S$_{22}$, S$_{12}$ and S$_{22}$ are turned on at zero voltage, the secondary voltage of the transformer is equal to u$_{ac}$, and the power is fed from the storage battery to the grid. An equivalent circuit is shown in FIG. 4C. Waveforms of three-phase capacitor currents i$_{wa}$, i$_{wb}$, and i$_{wc}$, a bus current i$_s$ and a switch tube control signal of the current source full-bridge converter, and primary and secondary voltages u$_p$ and u$_s$ of the high-frequency transformer may be obtained with reference to the oscillogram during the time period [t$_2$, t$_3$] as shown in FIG. 6.

4) State 4: Current Source Full-Bridge Converter Commutation

Figure 4D:
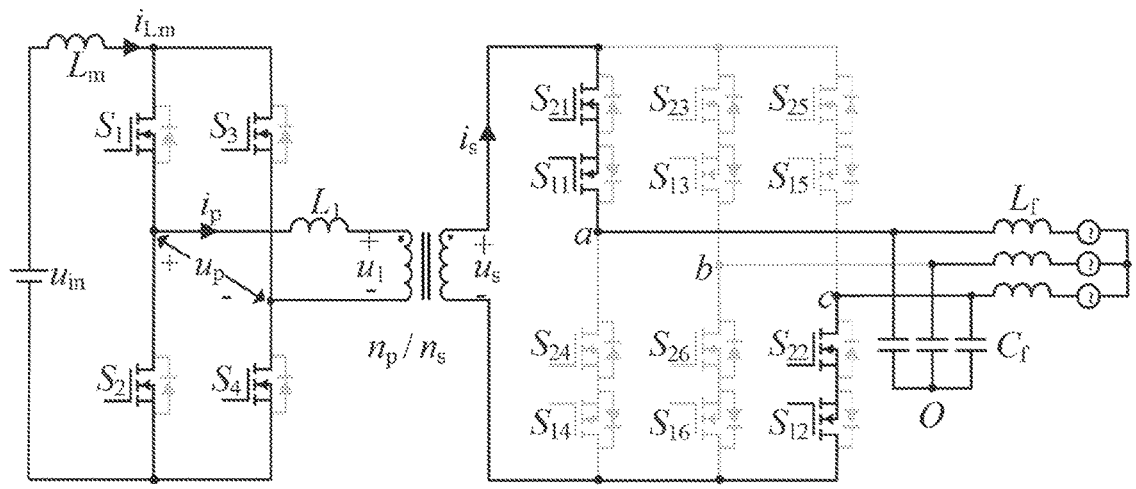

All switch tubes of the current source full-bridge converter are turned on and enter an overlapped ON area of the primary switch tubes. The bus inductor limits a current change rate, and therefore, the switch tubes S$_2$ and S$_3$ are turned on at zero current. A secondary voltage is mapped to the primary side of the transformer, a leakage inductive current is decreased linearly, currents of the switch tubes S$_2$ and S$_3$ are increased linearly, and currents of the switch tubes S$_1$ and S$_4$ are decreased linearly. The overlapped ON time T$_d$ of the current source full-bridge converter can be calculated by Formula (1), and for reliable commutation, the time of T$_d$ is appropriately increased. The sum of output currents in the overlapped area is zero, and therefore, in order to reduce the output current harmonics of the converter, it is necessary to compensate the action time of the vectors of the matrix converter by using Formula (2). i$_{Lm}$, L$_1$, n$_p$/n$_s$, and u$_{ac}$ are bus current, transformer leakage inductance, transformer turn ratio, and ac-phase line voltage of an output capacitor, respectively. T$_1$, T$_2$, and T$_0$ are the action times of vectors I$_{1+}$, I$_{2+}$, and I$_7$, respectively, m$_a$ and θ$_i$ are the modulation ratio and the angle of space vector modulation, respectively, and T$_s$ is a switch cycle. An equivalent circuit of the current source full-bridge converter commutation stage is shown in FIG. 4D. Waveforms of three-phase capacitor currents i$_{wa}$, i$_{wb}$, and i$_{wc}$, a bus current i$_s$ and a switch tube control signal of the current source full-bridge converter, and primary and secondary voltages u$_p$ and u$_s$ of the high-frequency transformer may be obtained with reference to the oscillogram during the time period [t$_3$, t$_4$] as shown in FIG. 6.

$$T_d = 2i_{Lm}L_1 n_s / u_{ac} n_p, \quad (1)$$

$$\begin{cases} T_1 = T_s m_a \sin\left(\dfrac{\pi}{6} - \theta_i\right) \\ T_2 = T_s m_a \sin\left(\dfrac{\pi}{6} + \theta_i\right) + 2T_d \\ T_0 = T_s - T_1 - T_2 \end{cases} \quad (2)$$

5) State 5: Current Source Full-Bridge Converter Freewheeling

Figure 4E:
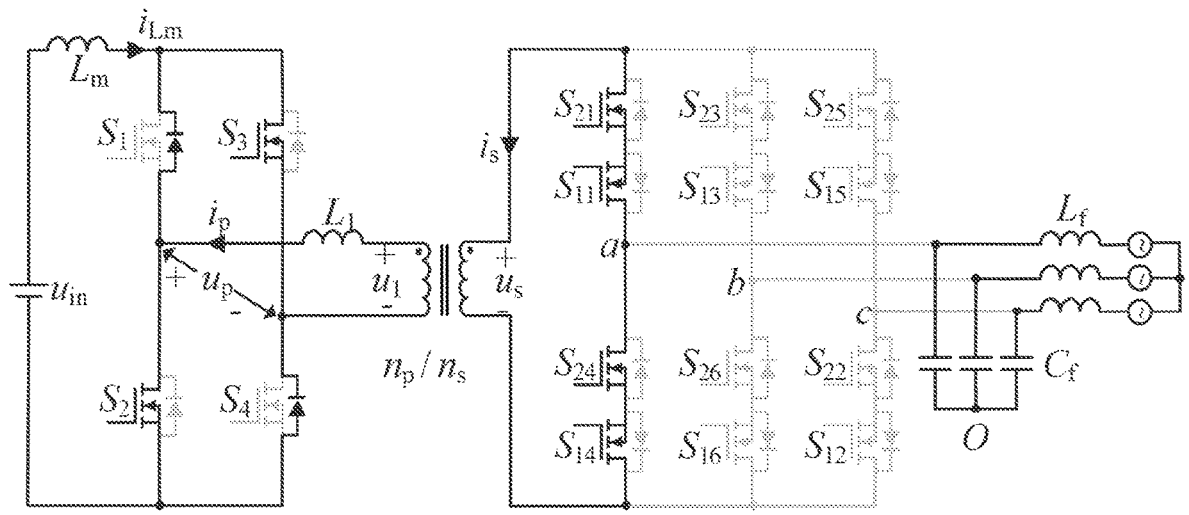

After the overlapped ON time T$_d$ of the current source full-bridge converter has expired, the matrix converter switch tubes S$_{12}$ and S$_{22}$ are turned off, and S$_{14}$ and S$_{24}$ are turned on at zero voltage. The secondary voltage of the transformer is equal to zero, and no power is transmitted at this time. Anti-parallel diodes of the current source full-bridge converter switch tubes S$_1$ and S$_4$ are freewheeling, S$_1$ and S$_4$ are turned off at zero current, and an equivalent circuit is shown in FIG. 4E. Waveforms of three-phase capacitor currents i$_{wa}$, i$_{wb}$, and i$_{wc}$, a bus current i$_s$ and a switch tube control signal of the current source full-bridge converter, and primary and secondary voltages u$_p$ and u$_s$ of the high-frequency transformer may be obtained with reference to the oscillogram during the time period [t$_4$, t$_5$] as shown in FIG. 6.

6) State 6: Inverter Switch Tube Being Turned On

Figure 4F:
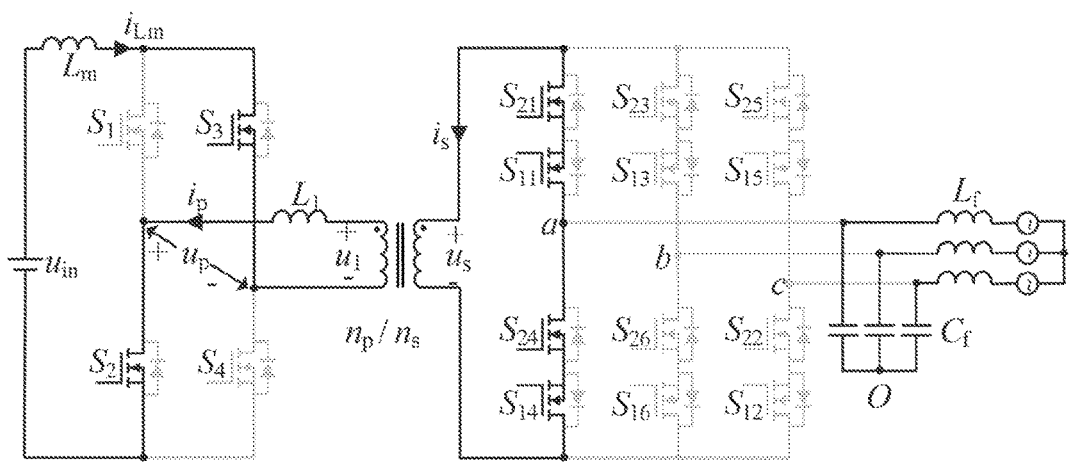

Similar to State 1, the current vector corresponding to the matrix converter 1.5 is the zero vector I$_7$. At this time, the matrix converter switch tubes S$_{21}$, S$_{11}$, S$_{24}$, and S$_{14}$ are turned on, and the current source full-bridge converter switch tubes S$_2$ and S$_3$ are turned on. At this time, it is in an inductive energy storage stage, and there is no energy flow between the storage battery and the grid. An equivalent circuit is shown in FIG. 4F. Waveforms of three-phase capacitor currents i$_{wa}$, i$_{wb}$, and i$_{wc}$, a bus current i$_s$ and a switch tube control signal of the current source full-bridge converter, and primary and secondary voltages u$_p$ and u$_s$ of the high-frequency transformer may be obtained with reference to the oscillogram during the time period [t$_5$, t$_6$] as shown in FIG. 6.

Figure 5:
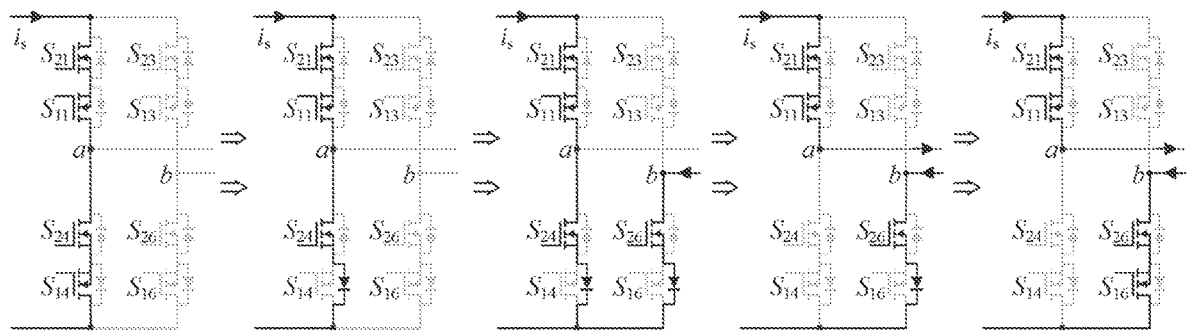
FIG. 5 is a flowchart of switching a zero vector $I_7$ to an active vector $I_{1+}$.

The process is as follows: the commutation method of the matrix converter of this application is explained with reference to FIG. 5, taking the zero vector I$_7$ switching to the active vector I$_{1+}$ as an example, first, the converter is in the zero vector state, and the switch tubes S$_{21}$, S$_{11}$, S$_{24}$, and S$_{14}$ are turned on, where the switch tubes S$_{21}$ and S$_{24}$ are turned on forwardly, the switch tubes S$_{11}$ and S$_{14}$ are in a synchronous rectification state, and an output current of the matrix converter is zero. The entire commutation process includes the following four steps:

The first step of commutation: the switch tube S$_{14}$ is turned off, and the current is commutated from a channel of S$_{14}$ to a body diode of S$_{14}$.

The second step of commutation: the switch tube S$_{26}$ is turned on, and the current flows through a channel of S$_{26}$ and a body diode of S$_{16}$.

The third step of commutation: the switch tube S$_{24}$ is turned off, and the output current of the matrix converter is equal to i$_s$.

Figure 7:
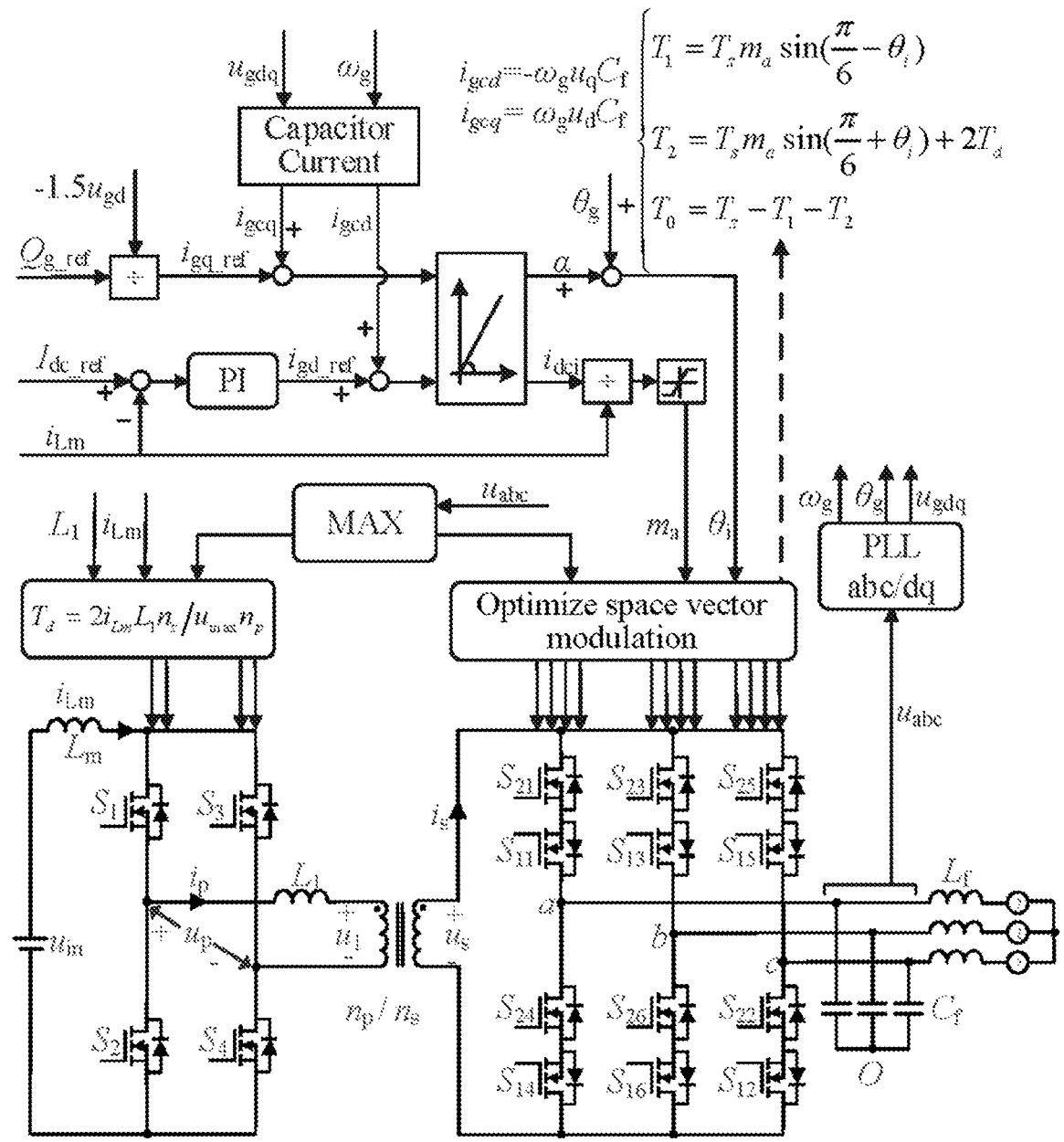
FIG. 7 is a system block diagram of a control system of a current source input high-frequency isolation matrix converter disclosed in this application.

The fourth step of commutation: the switch tube S$_{16}$ is turned on, and the current is commutated from the body diode of S$_{16}$ to the channel of S$_{16}$, and S$_{16}$ is in the synchronous rectification state. For the current source input high-frequency matrix converter shown in FIG. 1, this application further proposes a control system shown in FIG. 7, which can be implemented by a DSP, and a control logic of the control system is as follows:

1) After a capacitor voltage u$_{abc}$ of a filter capacitor passes through a phase-locked loop, a frequency ω$_g$ and a phase θ$_g$ of a power grid are obtained, and a dq-axis component u$_{gdq}$ of the filter capacitor voltage is obtained through coordinate transformation.

2) The dq-axis component $u_{dq}$ of the capacitor voltage of the filter capacitor passes through a low-pass filter to obtain a steady-state component of the capacitor voltage, and steady-state currents $i_{gcd}$ and $i_{gcq}$ of the filter capacitor are calculated by Formula 3.

$$\begin{cases} i_{gcd} = -\omega_g u_q C_f \\ i_{gcq} = \omega_g u_d C_f \end{cases} \quad (3)$$

3) An error between a given bus current $I_{dc\_ref}$ and an actual current $i_{Lm}$ are subjected to a PI controller to obtain a given d-axis current $i_{gd\_ref}$. In order to obtain a unit power factor, a given system reactive power $Q_{g\_ref}$ is zero, and a given q-axis current $i_{gq\_ref}$ is zero.

4) Given d-axis and q-axis currents $i_{gd\_ref}$ and $i_{gd\_ref}$ compensate the steady-state currents $i_{gcd}$ and $i_{gcq}$ of the capacitor to obtain a final given current, and a Cartesian coordinate system is converted to a polar coordinate system to obtain a given DC current $i_{dci}$ and a trigger delay angle α;

5) The given DC current $i_{dci}$ is divided with the actual current value $i_{Lm}$ to obtain a modulation ratio $m_a$ of the space vector modulation, the delay angle and a grid phase angle $\theta_g$ may be added to obtain a modulation angle $\theta_i$, and twelve switching pulses of the matrix converter are generated by using the modulation ratio and the angle;

6) A current overlapped time of the current source full-bridge converter may be obtained according to Formula 1, and then an output pulse of the current source full-bridge converter may be generated.

Compared with the conventional current source space vector modulation method, the space vector modulation solution used in this application not only calculates an action time of each current vector, but also adjusts an action sequence of the current vectors according to magnitudes of voltages outputted by a three-phase capacitor to achieve soft switching of all switch tubes.

Figure 10:
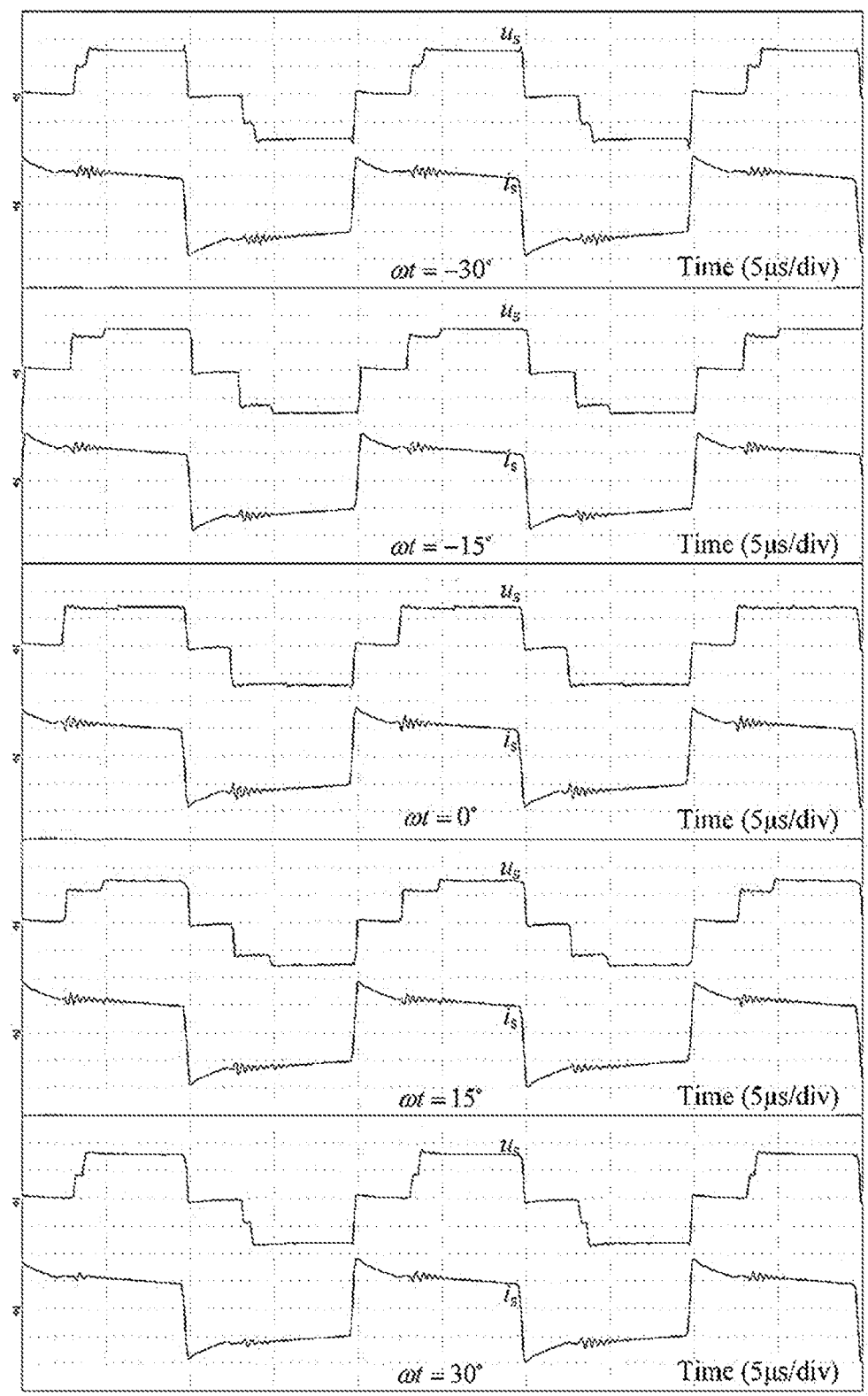
FIG. 10 is a comparison diagram of input voltages and currents of a matrix converter under different angles.
Figure 11:
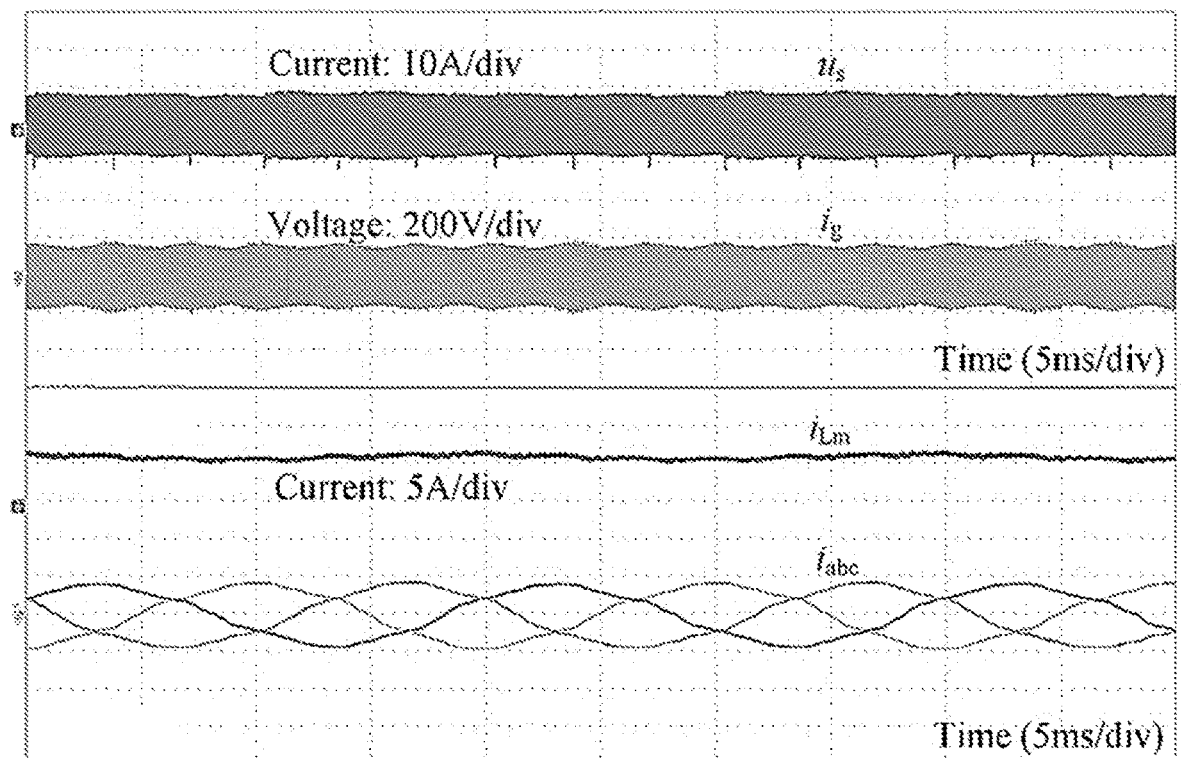
FIG. 11 is an oscillogram of a steady-state voltage and current of a matrix converter.

As shown in FIG. 10, at each modulation angle of sector I, the input voltage $u_s$ of the matrix converter may be ascending, that is, all the switch tubes of the matrix converter are turned on at zero voltage at this time, and the soft switching helps reduce the rate of voltage change of the system, suppress the electromagnetic interference of the system, and reduce the volume and mass of the system EMI filter. As can be seen from FIG. 11, the current of the bus inductor and the current of the three-phase grid are constant, and the constant bus current makes the high-frequency transformer current a square wave, which helps extend the service life of a DC power supply, and using the bus inductor to replace the bus electrolytic capacitor helps enhance the reliability of the system.

Figure 8:
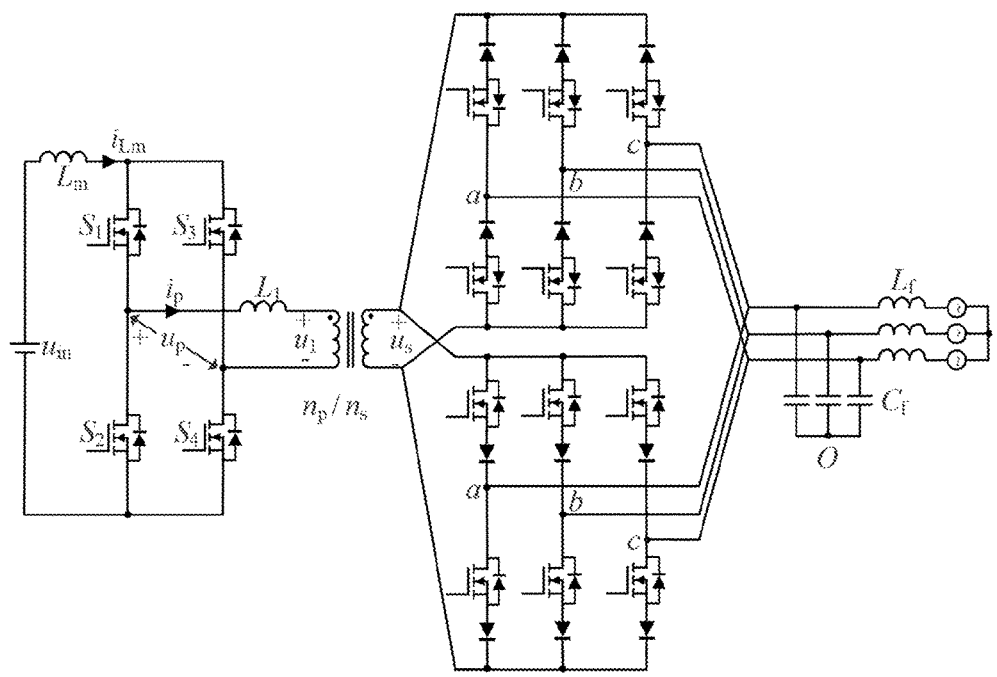
FIG. 8 is a decoupling circuit diagram of a current source input high-frequency matrix converter disclosed in this application.
Figure 9:
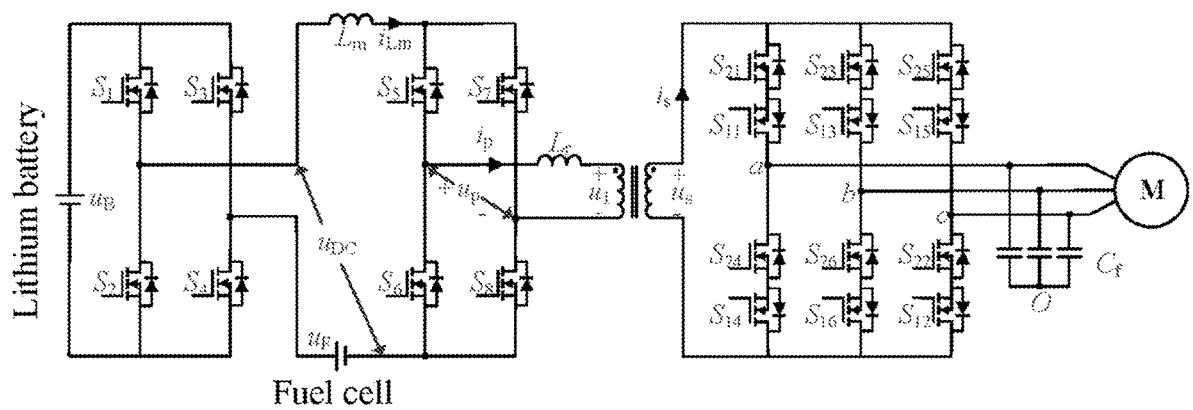
FIG. 9 is a circuit diagram of a driving system of a current input motor according to a specific embodiment.

As can be seen from FIG. 8, the current source input high-frequency matrix converter disclosed in this application can be equivalently decoupled into two current source fed three-phase converters connected in parallel, so the current source input matrix converter is suitable for application scenarios of current source three-phase converters, that is, application scenarios that require sine wave power supply, and have advantages of desirable output waveform quality, low electromagnetic interference, and strong short-circuit resistance of the current source three-phase inverters. For example, the current source input high-frequency matrix converter disclosed in this application is used for a driving system of a fuel cell hybrid motor. As shown in FIG. 9, a DC/DC converter is connected in series between a fuel cell and an inductor to adjust an output voltage of a lithium battery, and then control a current of a bus inductor. Compared with a grid-connected current input matrix converter, a modulation degree is used for controlling the bus current. When the current source input matrix converter is applied to the field of hybrid electric motor driving, a modulation ratio of the matrix converter is kept at a fixed unit value, a bus current is controlled by a DC converter of the lithium battery, and phase tracking of a voltage of a three-phase capacitor no longer uses a phase-locked loop, but is realized by encoder detection. When the motor is in a braking state, the direction of the bus current does not change, an average output voltage of the DC converter is a negative value, and motor energy can be fed back to the lithium battery through the DC converter.

The foregoing embodiments are merely preferred embodiments of the present invention, but the embodiments are not intended to limit the scope of implementation of the present invention. A person skilled in the art may make various changes and modifications without departing from the spirit and scope of the present invention. Therefore, the protection scope of the present invention should be subject to the claims.

What is claimed is:

1. A current source input high-frequency isolation matrix converter, comprising:
a current source full-bridge converter having an input DC bus connected to a DC side current source,
a high-frequency transformer having a primary coil connected to an output end of the current source full-bridge converter,
a matrix converter having a DC bus connected to a secondary coil of the high-frequency transformer, and
a three-phase filter circuit, wherein a capacitor in each phase filter circuit is connected in parallel between a midpoint of a corresponding phase bridge arm of the matrix converter and a reference potential point, and an output end of the each phase filter circuit is connected to an AC side, wherein
an action sequence of current vectors of the matrix converter is determined according to a line voltage loaded on a filter capacitor, and the current source input high-frequency isolation matrix converter is subjected to a positive half-cycle zero vector action stage, a first active vector action stage, a second active vector action stage, a current source full-bridge converter commutation stage, a current source full-bridge converter freewheeling stage, and a negative half-cycle zero vector action stage in turn under the action sequence of the current vectors.

2. A method for controlling the current source input high-frequency isolation matrix converter according to claim 1, wherein
the current source full-bridge converter comprises: a first bridge arm formed by a first switch tube and a second switch tube connected in series, and a second bridge arm formed by a third switch tube and a fourth switch tube connected in series, and the matrix converter comprises: an a-phase bridge arm formed by a first bidirectional switch tube and a fourth bidirectional switch tube connected in series, a b-phase bridge arm formed by a third bidirectional switch tube and a sixth bidirectional switch tube connected in series, and a c-phase bridge arm formed by a fifth bidirectional switch tube and a second bidirectional switch tube connected in series; and
three current vectors acting on the matrix converter in a positive half cycle of a switch are a zero vector $I_7$, a first active vector $I_{1+}$, and a second active vector $I_{2+}$, corresponding input voltages of the matrix converter are $U_0$, $U_1$, and $U_2$, after line voltages on adjacent two-phase capacitors are compared, and when an action sequence of the three current vectors is determined to be $I_7 > I_{1+} > I_{2+}$, $U_2 > U_1 > U_0$, and a control process of the current source input high-frequency isolation matrix converter in the positive half cycle of the switch is as follows:

state 1: the positive half-cycle zero vector action stage at a beginning of a switch cycle, the zero vector $I_7$ acts on the matrix converter, the first bidirectional switch and the fourth bidirectional switch in the matrix converter are turned on, and the first switch tube and the fourth switch in the current source full-bridge converter are turned on;

state 2: the first active vector action stage after a zero vector action time has expired, the first active vector $I_{1+}$ acts on the matrix converter, the first switch tube and the fourth switch tube in the current source full-bridge converter maintain an ON state, a phase voltage on an ab-phase capacitor is greater than 0, a secondary current of the high-frequency transformer charges an output capacitor of the sixth bidirectional switch tube, the sixth bidirectional switch tube is turned on at zero voltage, the fourth bidirectional switch tube is turned off, a secondary voltage of the high-frequency transformer is equal to a line voltage on the ab-phase capacitor, and an energy is fed from a DC side to the AC side;

state 3: the second active vector action stage after an action time of the first active vector $I_{1+}$ has expired, the second active vector $I_{2+}$ acts on the matrix converter, the first switch tube and the fourth switch tube in the current source full-bridge converter maintain the ON state, a line voltage on an ac-phase capacitor is greater than the line voltage on the ab-phase capacitor, the secondary current of the high-frequency transformer charges an output capacitor of the second bidirectional switch, the second bidirectional switch is turned on at zero voltage, the sixth bidirectional switch is turned off, the secondary voltage of the high-frequency transformer is equal to the line voltage on the ac-phase capacitor, and the energy is fed from the DC side to the AC side;

state 4: the current source full-bridge converter commutation stage in the matrix converter, the first bidirectional switch tube and the second bidirectional switch tube maintain the ON state, the first, second, third, and fourth switches of the current source full-bridge converter are overlapped and turned on, and the second switch tube and the third switch tube are turned on at zero current;

state 5: the current source full-bridge converter freewheeling stage after an overlapped ON time of the first, second, third, and fourth switches of the current source full-bridge converter has expired, the second bidirectional switch tube in the matrix converter is turned off, the fourth bidirectional switch tube is turned on at zero voltage, a secondary voltage of the current source full-bridge converter is zero, anti-parallel diodes of the first switch tube and the fourth switch tube are freewheeling, and the first switch tube and the fourth switch tube are turned off at zero current; and state 6: the negative half-cycle zero vector action stage after the first switch tube and the fourth switch tube are turned off at zero current, the zero vector $I_7$ acts on the matrix converter, the first bidirectional switch and the fourth bidirectional switch tube in the matrix converter maintain the ON state, and the second switch tube and the third switch tube in the current source full-bridge converter maintain the ON state.

3. The method according to claim 2, wherein action times of the three current vectors of the matrix converter are corrected according to the overlapped ON time of the first, second, third, and fourth switches of the current source full-bridge converter to obtain corrected action times.

4. The method according to claim 3, wherein the corrected action times of the three current vectors of the matrix converter are:

$$\begin{cases} T_1 = T_s m_a \sin\left(\frac{\pi}{6} - \theta_i\right) \\ T_2 = T_s m_a \sin\left(\frac{\pi}{6} + \theta_i\right) + 2T_d, \\ T_0 = T_s - T_1 - T_2 \end{cases}$$

wherein $T_1$, $T_2$, and $T_0$ are the action times of the first active vector $I_{1+}$, the second active vector $I_{2+}$, and the zero vector $I_7$, respectively, $m_a$ and $\theta_i$ are a modulation ratio and an angle of space vector modulation, $T_s$ is a switch cycle, and $T_d$ is the overlapped ON time of the first, second, third, and fourth switches of the current source full-bridge converter.

5. The method according to claim 4, wherein the overlapped ON time of the first, second, third, and fourth switches of the current source full-bridge converter is $$T_d = 2 i_{Lm} L_1 n_s / u_{ac} n_p,$$

wherein $T_d$ is the overlapped ON time of the first, second, third, and fourth switches of the current source full-bridge converter, $i_{Lm}$ is a DC bus current of the current source full-bridge converter, $L_1$ is a leakage inductance of the high-frequency transformer, $n_p/n_s$ is a turn ratio of the high-frequency transformer, and $u_{ac}$ is the line voltage on the ac-phase capacitor.

6. A control system of the current source input high-frequency isolation matrix converter according to claim 1, comprising:

a PLL having an input end connected to line voltages on adjacent two-phase capacitors, and outputting a grid frequency $\omega_g$, a grid phase $\theta_g$, and a dq-axis component of a voltage of the filter capacitor;

a low-pass filter having an input end connected to the dq-axis component of the voltage of the filter capacitor and the grid frequency, and outputting a steady-state current of the filter capacitor;

a current given-value correction module having an input end connected to a given current value and an actual current value of the input DC bus of the current source full-bridge converter and a d-axis component of the steady-state current of the filter capacitor, wherein an error between the given current value and the actual current value of the input DC bus of the current source full-bridge converter is processed by a PI and then accumulates the d-axis component of the steady-state current of the filter capacitor, and a final current given-value is outputted;

a coordinate transformation module configured to perform a coordinate transformation on the final current given-value, and output a given-value of a DC current and a trigger delay angle; and a space vector modulation module having an input end connected to the given-value of the DC current and the trigger delay angle, and configured to calculate a modulation ratio and a modulation angle, and then output a switching pulse of the matrix converter.

7. The control system according to claim 6, wherein the control system further comprises a selector and an overlapped ON time calculation module, wherein the selector is configured to select a maximum value from the line voltages on the adjacent two-phase capacitors and output the maximum value, and the overlapped ON time calculation module is configured to calculate an overlapped ON time of switches of the current source full-bridge converter according to the maximum value outputted by the selector, a current of the input DC bus of the current source full-bridge converter, and a leakage inductance of the high-frequency transformer, and the space vector modulation module is configured to correct action times of three current vectors of the matrix converter according to a calculation result outputted by the overlapped ON time calculation module.

8. The current source input high-frequency isolation matrix converter according to claim 1, wherein the converter is suitable for application scenarios of a sine wave power supply.

9. A driving system of a fuel cell hybrid electric motor, comprising the current source input high-frequency matrix converter according to claim 1, wherein a DC converter connected between a current source and the input DC bus of the current source full-bridge converter, an output end of the three-phase filter circuit is connected to a three-phase motor.

10. The driving system according to claim 9, wherein a modulation ratio is set to a fixed value, a phase of a voltage of a three-phase filter capacitor is detected by using an encoder, and a current inputted to the DC bus of the current source full-bridge converter is adjusted by controlling the DC converter.

\* \* \* \* \*